United States Patent [19]

Vagelatos et al.

[11] 4,251,724
[45] Feb. 17, 1981

[54] METHOD AND APPARATUS FOR DETERMINATION OF TEMPERATURE, NEUTRON ABSORPTION CROSS SECTION AND NEUTRON MODERATING POWER

[75] Inventors: Nicholas Vagelatos; Donald K. Steinman; Joseph John, all of San Diego; Jack C. Young, Escondido, all of Calif.

[73] Assignee: IRT Corporation, San Diego, Calif.

[21] Appl. No.: 871,759

[22] Filed: Jan. 23, 1978

[51] Int. Cl.² ........................ G01V 5/00; B01D 59/44
[52] U.S. Cl. ................................ 250/264; 250/265; 250/269; 250/390; 250/392
[58] Field of Search ............... 250/391, 390, 392, 265, 250/269, 264; 73/339 R

[56] References Cited

U.S. PATENT DOCUMENTS

| | | | |
|---|---|---|---|
| 3,051,838 | 8/1962 | Culp | 250/392 |
| 3,435,217 | 3/1969 | Givens | 250/265 |
| 3,691,378 | 9/1972 | Hopkinson et al. | 250/264 |
| 4,004,147 | 1/1977 | Allen | 250/264 |

FOREIGN PATENT DOCUMENTS 1154653  9/1963  Fed. Rep. of Germany ........... 250/390

OTHER PUBLICATIONS

E. Richard Cohen, "A Survey of Neutron Thermalization Theory", International Conference on Peaceful Uses of Atomic Energy, United Nations Publication, N.Y., 1956, vol. 5, pp. 405–416.

*Primary Examiner*—Alfred E. Smith
*Assistant Examiner*—Carolyn E. Fields
*Attorney, Agent, or Firm*—Fitch, Even, Tabin, Flannery & Welsh

[57] ABSTRACT

A nuclear method and apparatus determines the temperature of a medium by injecting fast neutrons into the medium and detecting returning slow neutrons in three first energy ranges by producing three respective detection signals. The detection signals are combined to produce three derived indicia each systematically related to the population of slow neutrons returning from the medium in a respective one of three second energy ranges, specifically exclusively epithermal neutrons, exclusively substantially all thermal neutrons and exclusively a portion of the thermal neutron spectrum. The derived indicia are compared with calibration indicia similarly systematically related to the population of slow neutrons in the same three second energy ranges returning from similarly irradiated calibration media for which the relationships temperature, neutron absorption cross section and neutron moderating power to such calibration indicia are known. The comparison indicates the temperature at which the calibration indicia correspond to the derived indicia and consequently the temperature of the medium. The neutron absorption cross section and moderating power of the medium can be identified at the same time.

26 Claims, 6 Drawing Figures

METHOD AND APPARATUS FOR DETERMINATION OF TEMPERATURE, NEUTRON ABSORPTION CROSS SECTION AND NEUTRON MODERATING POWER

The present invention is directed to a method and apparatus for the non-contact determination of temperature, particularly by measurement of thermalized neutrons. Still more particularly, the present invention is directed to a method and apparatus whereby a medium is irradiated with fast neutrons, and slow neutrons thereupon returning from the medium are measured in three different energy ranges, the three measurements being correlated to provide a determination of the temperature of the medium. Even more particularly, indications of the neutron absorption cross section and the moderating power of the medium are determined at the same time.

It is well known, as in nuclear well logging, to determine various properties of a medium by irradiating the medium with fast neutrons and measuring returning slow neutrons of various energies. Porosity and neutron capture capability have been determined in this way in the effort to locate oil along boreholes. Temperature along boreholes has also been measured, generally by contact devices such as resistor bridges, but also by infrared measurements. The measurement of temperature by non-contact nuclear means is also known, as by the method shown by Borst U.S. Pat. No. 3,099,745, wherein a medium is irradiated with fast neutrons and the energy distribution of emerging thermal neutrons in thermal equilibrium with the medium is measured to obtain an indication of the temperature of the medium. The Borst method and apparatus were designed for laboratory use and particularly for measuring extremely low temperatures, such as below 20° K. They involve difficult and time consuming techniques not particularly suited for industrial or borehole measurements. The present invention depends upon the same underlying fundamental and well-known relationship of thermal neutron energy to temperature, but utilizes a somewhat different aspect of the relationship whereby three separate measurements of neutron flux in different energy ranges are utilized to determine temperature, and at the same time the neutron absorption cross section and the moderating power of the medium, particularly in boreholes.

When energetic neutrons are injected into a medium, they propagate through it, and they slow down (they are moderated) as a result of collisions with the surrounding atoms. The slowing down process continues until the kinetic energy of the neutrons is reduced to the range of vibrational energies of the moderating medium. The neutrons diffuse through the medium, rapidly approaching thermal equilibrium. The average thermal neutron energy is constant as long as the neutron properties of the moderator and its temperature are fixed, because the energy loss to a thermal neutron averaged over many collisions is zero.

The moderated neutron energy spectrum is described by the expression $$\phi(E) = 2\pi n \, (2/m_n)^{\frac{1}{2}} (\pi k T_n)^{-3/2} E \exp(-E/kT_n) + CE^{-1}, \quad (1)$$

where
$\phi(E)$ = neutron flux
$n$ = neutron density
$m_n$ = neutron mass
$k$ = Boltzman constant
$E$ = neutron kinetic energy
$T_n$ = neutron temperature and
$C$ = constant. The first term in equation (1) is a Maxwellian function representing the thermal portion of the moderated neutron flux. It is also the portion of the spectrum which is sensitive to the moderator temperature via the parameter $T_n$.

$$T_n = f(T, \Sigma_a, \xi \Sigma_s), \quad (2)$$

where
$T$ = moderator temperature
$\Sigma_a$ = neutron absorption cross section
$\Sigma_s$ = neutron scattering cross section and
$\xi$ = average logarithmic energy loss per neutron collision with a moderator atom.
$\xi \Sigma_s$ = moderating power of a medium.

The second term in equation (1) represents the slowing down region of the moderated neutron spectrum. The constant C, which determines the amplitude of this portion of the spectrum, depends on the moderating properties of the medium but is independent of the medium temperature.

Since the information regarding the moderating medium temperature is implicit in the energy distribution of thermal neutrons propagating through it, it is possible to determine the medium temperature by appropriately sampling the moderated neutron spectrum. Since the thermal neutron spectrum depends on three properties of the medium, neutron absorption cross section $\Sigma_a$, neutron moderating power $\xi \Sigma_s$, and temperature $T$, only three independent measurements are necessary to determine unambiguously the temperature of a medium.

It is thus a primary object of the present invention to provide a method and apparatus for the non-contact determination of the temperature of a medium wherein the medium is irradiated by neutrons and, after thermalization in the medium, slow neutrons are measured in three different energy ranges. It is a further object to provide such determination of temperature simultaneously with the determination of the neutron absorption cross section and the moderating power of the medium. It is still another object to provide a method and apparatus for such determination in a borehole by nuclear well logging techniques. Other objects and advantages of the present invention will become apparent from the following detailed description, particularly when taken in conjunction with the accompanying drawings, in which:

Figure 1:
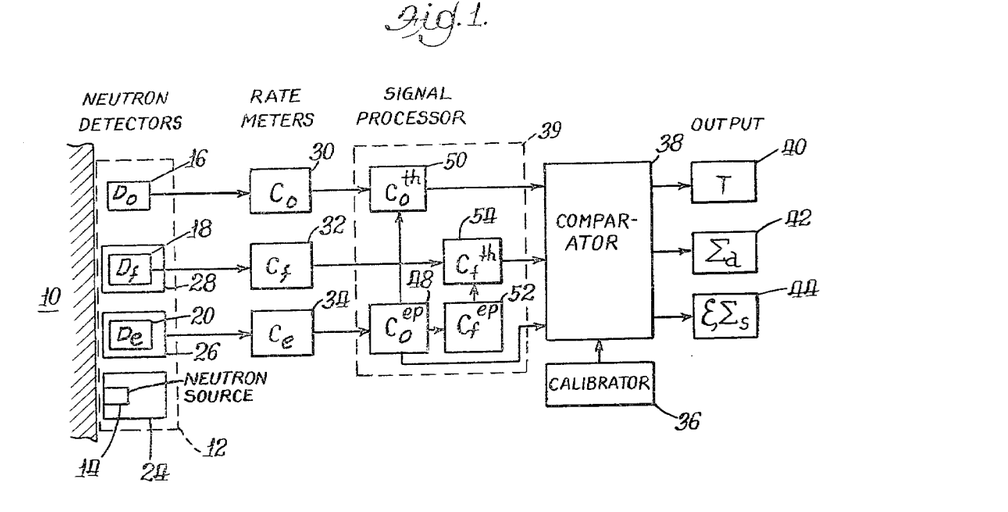
FIG. 1 is a diagrammatic illustration of one form of the apparatus of the present invention.
Figure 2:
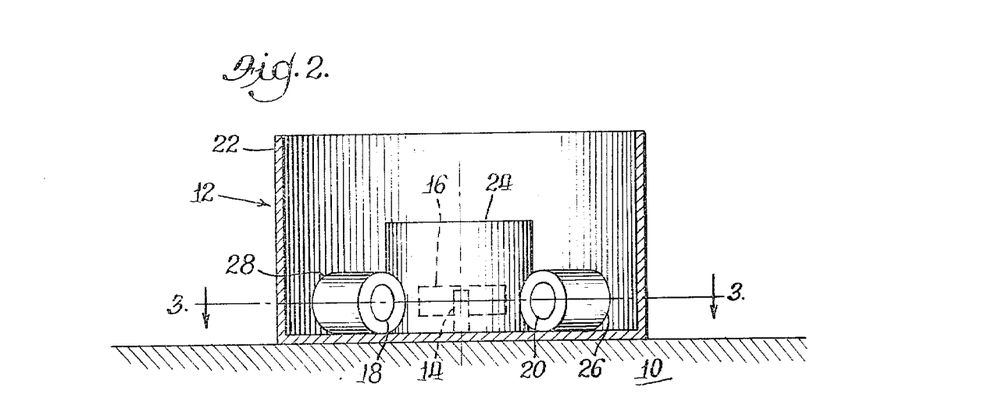
FIG. 2 is a front elevation of the detector head of the apparatus shown in FIG. 1, with the housing thereof shown in section.
Figure 3:
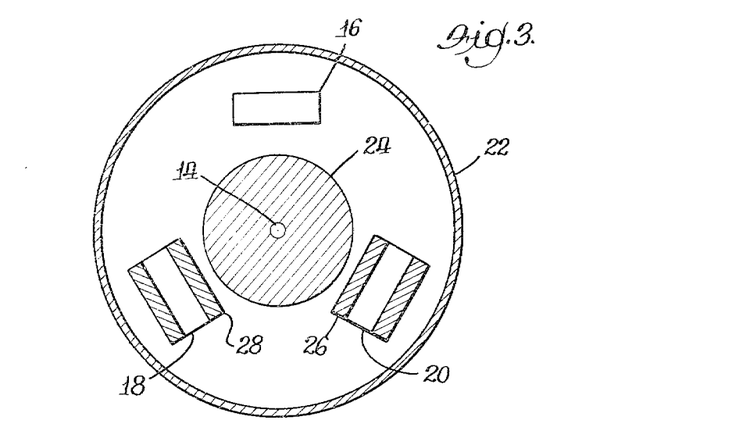
FIG. 3 is a view of the detector head shown in FIG. 2, taken in cross section along line 3—3 of FIG. 2.

FIG. 1 is a diagrammatic illustration of the apparatus of the present invention for determining the temperature T, the neutron absorption $\Sigma_a$ and the moderating power $\xi\Sigma_s$ of a medium 10. The neutron irradiating and detecting apparatus is contained in a detector head or sonde 12. One form of the head 12 includes a neutron source 14 and slow neutron detectors 16, 18 and 20 disposed in a housing 22.

The neutron source 14 is disposed adjacent the medium 10, whereby fast neutrons emitted by the source 14 irradiate the medium 10. The source 14 may be formed of californium-252, emitting fast neutrons with an average energy of about 2 mev. The strength of the source may be whatever proves suitable for existing conditions in providing suitably high counting rates in the detectors 16, 18 and 20 for speed and accuracy in detection in the presence of background, yet the source should not be so strong as to be expensive or hazardous to use. Hazard and background are reduced by a shield 24 disposed about the neutron source 14 on all sides but that facing the medium 10. This absorbs neutrons that would otherwise pass into surrounding materials other than the medium 10, yet permits the unhindered injection of fast neutrons into the medium 10. Appropriate shielding includes materials of high hydrogen content, such as polyethylene or glycerol, containing strong thermal neutron absorbers, such as boron, cadmium or lithium, in solution or in layers.

The fast neutrons entering the medium 10 are moderated by the transfer of energy to the nuclear particles making up the medium until the neutrons reach thermal equilibrium with the medium. The thermalized neutrons diffuse back out of the medium 10 to reach the detectors 16, 18 and 20. The detectors are disposed close to the neutron source 14 and close to each other so as to be sensitive to neutrons thermalized in the same part of the medium 10. The detectors 16, 18 and 20 are preferably substantially identical slow neutron detectors, such as helium-3 proportional counters. Helium-3 detectors are essentially insensitive to fast neutrons, but respond to thermal and epithermal neutrons by producing corresponding electrical pulses of substantially constant amplitude, the amplitudes being somewhat less for detection events occurring near the margins of the detectors where the resulting ionization is less because the ionizing particles strike the margins of the detectors without fully ionizing the detection gas. The detectors 16, 18 and 20 are made sensitive to slow neutrons of different energy ranges, as by appropriate different shielding. Preferably, the detector 16 is a bare or unshielded detector $D_o$, responsive to slow neutrons over a broad range of energies. The detector 20 is shielded by a shield 26 of a material, specifically cadmium, that strongly captures thermal neutrons so as to make the detector 20 sensitive substantially only to slow neutrons above thermal energies. The cutoff energy is about 0.4 ev, which is somewhat above the thermal range. The detector 20 is thus a detector $D_e$ of epithermal neutrons. The detector 18 is shielded by a filter or shield 28 of a material of well known neutron absorption properties, such as gadolinium, samarium or boron, that acts to absorb neutrons in a portion of the range of thermal energies. For better sensitivity, it is desirable that cutoff be at energies of neutrons near the temperatures being detected, for example, at about 0.03 ev for room temperature. The detector 18 is thus a detector $D_f$ of filtered neutrons.

The detectors 16, 18 and 20 are operated in a conventional manner, utilizing conventional powers supplies, not shown, connected in a conventional manner. The output signals from the detectors 16, 18 and 20 in the form of electronic pulses are applied to respective count rate meter circuits 30, 32 and 34. These circuits may comprise conventional integrating circuits, or they may be digital counters counting for fixed periods of time. Such circuits may be encompassed in a microprocessor. Any of a number of well-known means may be used to provide respective detection signals indicating the counting rate of detection pulses produced by the respective detectors 16, 18 and 20 and hence slow neutron population in the three different energy ranges. Counting rate $C_o$ is a detection signal indicating the population of slow neutrons detected by the bare detector 16 over substantially the total range of energies; counting rate $C_f$ is a detection signal indicating the population of slow neutrons detected by the filtered detector 18 over a portion of the range of energies including but a portion of the thermal region; and counting rate $C_e$ is a detection signal indicating the population of slow neutrons detected by the epithermal detector 20 substantially exclusively in the epithermal region.

The three detection signals $C_o$, $C_f$ and $C_e$ relate to temperature T, as well as to the neutron absorption cross section $\Sigma_a$ and the neutron moderating power $\xi\Sigma_s$ of the medium 10. Given the relationships, the three properties can be unambiguously determined from the three detection signals. The relationships can be determined empirically, using the detection apparatus for determining the three detection signals $C_o$, $C_f$ and $C_e$ with representative sample materials at various temperatures. The relationships may be stored in a calibrator 36 and may be presented in various forms, as will be discussed further below. These relationships are applied to a comparator 38 to which the detection signals $C_o$, $C_f$ and $C_e$ are applied by way of a signal processor 39. The signal processor combines the three detection signals to produce three derived indicia to which the comparator 38 responds by comparing the derived indicia to the stored information received from the calibrator 36.

More particularly, in a preferred embodiment of the invention, the three detection signals in the respective three first energy ranges described above are combined to produce three respective derived indicia each systematically related to the population of slow neutrons returning from the medium in a respective one of three second energy ranges:

1. An indicium $C_o{}^{ep}$ ("ep" referring to epithermal) indicating the population of slow neutrons exclusively epithermal. As the relationship to the detection signal $C_e$ is linear and hence a matter of calibration, $C_e$ may be used for the indicium $C_o{}^{ep}$ by taking account of the calibration factor.

2. An indicium $C_o{}^{th}$ ("th" referring to thermal) indicating the population of slow neutrons exclusively thermal over substantially the entire range of thermal energies. By use of suitable detectors, as described further below, the indicium $C_o{}^{th}$ may be produced by differentially combining the derived indicium $C_o{}^{ep}$ with the detection signal $C_o$ to remove the epithermal component from the detection signal $C_o$.

3. An indicium $C_f{}^{th}$ indicating the population of slow neutrons exclusively thermal over a limited portion of the thermal neutron spectrum. The epithermal portion $C_f{}^{ep}$ of the detection signal $C_f$ can be determined from the indicium $C_o{}^{ep}$ in a way similar to the inverse of the manner in which the indicium $C_o{}^{ep}$ is derived from the detection signal $C_e$, and the thermal portion $C_f{}^{th}$ can then be derived in a way similar to the manner in which the thermal portion $C_o^{th}$ of the signal $C_o$ is derived.

The relationships between the derived indicia and the properties temperature T, neutron absorption cross section $\Sigma_a$ and neutron moderating power $\xi\Sigma_s$ may be determined empirically by utilizing the method and apparatus thus far described to irradiate calibration media having known properties over a range of temperatures and derive calibration indicia corresponding to the derived indicia $C_o^{ep}$, $C_o^{th}$ and $C_f^{th}$. The relationships are stored in the calibrator 36. The comparator 38 may then interrogate the calibrator 36 to determine the temperature T, neutron absorption cross section $\Sigma_a$ and neutron moderating power $\xi\Sigma_s$ which produce calibration indicia corresponding to the derived indicia. The comparator 38 thereupon produces output signals corresponding to the temperature T, the neutron absorption cross section $\Sigma_a$ and the neutron moderating power $\xi\Sigma_s$ of the medium 10. These output signals are applied to output devices 40, 42 and 44 which may be conventional recorders or separate parts of the same recorder. The recorder may include a strip chart driven as a function of time or position or event in a conventional manner.

The operation of the present invention will be better understood from the following explanation of the use of a more specific exemplary apparatus in which the bare detector 16 is unshielded, the filtered detector 18 is shielded by gadolinium, and the epithermal detector 20 is shielded by cadmium. Under these conditions, the counting rate recorded for the bare detector 16 can be expressed by $$C_o = C_B = \int_0^{E_{max}} dE \cdot \phi(E) \cdot \epsilon(E), \quad (3)$$

where $\phi(E)$ is given by equation (1) and $\epsilon(E)$ is the counting efficiency of the neutron detector. $E_{max}$ is the maximum kinetic energy of source neutrons. Similarly, the counting rate recorded for the gadolinium-covered filtered neutron detector 18 is $$C_f = C_{Gd} = \int_0^{E_{max}} dE \cdot \phi(E) \cdot \epsilon(E) \cdot \tau_{Gd}(E, t_{Gd}), \quad (4)$$

where $\tau_{Gd}(E, t_{Gd})$ is the transmission function of the filter 28, in this case gadolinium, and $t_{Gd}$ is the filter thickness. The cadmium-covered detector 20 counting rate is $$C_e = C_{Cd} = \int_{E_{Cd}}^{E_{max}} dE \cdot \phi(E) \cdot \epsilon(E) \cdot \tau_{Cd}(E, t_{Cd}), \quad (5)$$

where $\tau_{Cd}(E, t_{Cd})$ is the transmission function of the shield 26, $E_{Cd}$ is the cadmium transmission cutoff (~0.4 ev) and $t_{Cd}$ is the thickness of the cadmium shield 26 ($t_{Cd} \gtrsim 0.03$ inch).

In general, $E_{Cd}$ is substantially greater than the average thermal neutron energies (except at very high temperatures of the medium 10, in excess of 1000° C.). Therefore, $C_{Cd}$ provides a measure of the epithermal neutron flux, i.e., the constant C in equation (1). As epithermal neutron flux is a function of the neutron moderating power $\xi\Sigma_s$ of the medium, this measurement alone provides a determination of $\xi\Sigma_s$. On the other hand, both $C_B$ and $C_{Gd}$ contain contributions both from the thermal and epithermal parts of the slow neutron flux. That is $$C_B = C_B^{th} + C_B^{ep}, \quad (6)$$

an $$C_{Gd} = C_{Gd}^{th} + C_{Gd}^{ep} \quad (7)$$

where the superscripts "th" and "ep" denote the thermal and epithermal components, respectively. Since $$C_B^{ep} = C \int_{E_o}^{E_{max}} dE \cdot E^{-1} \cdot \epsilon(E), \quad (8)$$

and $$C_{Gd}^{ep} = C \int_{E_o}^{E_{max}} dE \cdot E^{-1} \cdot \epsilon(E) \cdot \tau_{Gd}(E, t_{Gd}), \quad (9)$$

where $E_o$ is the low energy cutoff of the slowing down region, the epithermal components $C_B^{ep}$ and $C_{Gd}^{ep}$ are independent of the temperature of the medium 10, and as such they constitute an undesirable background in respect to temperature determination. However, as $C_{Cd}$ has no thermal component, $C_B^{ep}$ and $C_{Gd}^{ep}$ can be determined therefrom, and the thermal components $C_{Gd}^{th}$ and $C_B^{th}$ of the respective gadolinium-filtered and bare detectors 18 and 16 can be obtained from equations (7) and (6), respectively. $C_{Gd}^{th}$, representing but a part of the thermal neutron flux, is a function of the detailed energy dependence of the thermal region of the moderated neutron flux. Therefore, $C_{Gd}^{th}$ provides a measure of $T_n$ and $$C_{Gd}^{th} = f(T, \Sigma_a, \xi\Sigma_s). \quad (10)$$

At a fixed temperature, the bare detector 16 thermal neutron count $C_B^{th}$ obtained in the moderating medium 10 represents all thermal neutrons and hence is directly proportional to the neutron absorption cross section $\Sigma_a$ of the medium 10. Therefore, $C_B^{th}$ provides a measure of $\Sigma_a$, and $$C_{Gd}^{th} = f(T, C_B^{th}, C). \quad (11)$$

Furthermore, there is a one to one correspondence between points in the three dimensional space represented by equations (10) and (11), so that each point in the $C_{Gd}^{th}$, $C_B^{th}$, C space corresponds to a unique set of values T, $\Sigma_a$, and $\xi\Sigma_s$.

Applying the apparatus of FIG. 1 to this example, the observed counting rates $C_B$, $C_{Gd}$ and $C_{Cd}$ are applied to the signal processor 39 as counting rates $C_o$, $C_f$ and $C_e$, respectively. The counting rate $C_{Cd}$ includes substantially exclusively epithermal neutrons, but it does not represent all of the epithermal neutrons that are directed to the detector 20 because the cadmium shield absorbs some epithermal neutrons and cuts off the lower portion of the epithermal spectrum. However, the factor by which the counting rate of epithermal neutrons is affected by the cadmium shield can be empirically determined for a given detector, as by testing the counting rate at a known flux with different thicknesses of cadmium shield. Counting rate can then be corrected by multiplying by the empirically determined correction constant. This correction is effected by a signal processing unit 48, which may comprise a microprocessor or may be an amplifier with a gain equal to the correction constant. The corrected epithermal neutron counting rate corresponds to the rate at which epithermal neutrons would be detected by the epithermal counter 20 in the absence of the cadmium shield. Not coincidentally, this is the same counting rate as the epithermal component of the bare detector 16, $C_B^{ep}$. (This assumes that the respective basic detectors and rate meters are identical; however, to the extent this is not the case, the difference can be corrected by appropriate conventional normalization or calibration.)

Having determined $C_B^{ep}$, it becomes possible to determine the thermal neutron component of $C_B$ by utilizing the relationship of equation (6). That is, the signal $C_B^{ep}$ can be subtracted from the signal $C_B$ to yield $C_B^{th}$. This is the function of a differential combining circuit 50, which may be included in a microprocessor or may take the form of a differential amplifier.

Similarly, the epithermal portion of the counting rate $C_{Gd}$ can be derived from the corrected counting rate of the detector 20. That is, the factor by which the epithermal portion as detected differs from what it would have been without the gadolinium shield can be determined empirically. This correction factor is introduced by a signal processing unit 52, which may comprise a microprocessor or may be an amplifier with a gain that is the reciprocal of the correction factor. The output of this unit is thus $C_{Gd}^{ep}$. In accordance with equation (7), the thermal component of the filtered counting rate $C_{Gd}^{th}$ may be derived by differentially combining the output $C_f$ of the rate meter 32 with the output $C_f^{ep}$ of the circuit 52. As in the case of the bare detector, this may be performed by a differential combining circuit 54, which may be included in a microprocessor or may take the form of a differential amplifier.

The derived signals $C_o^{ep}$, $C_o^{th}$ and $C_f^{th}$ are then applied to the comparator 38 which addresses the calibrator 36 to determine what values of T, $\Sigma_a$ and $\xi\Sigma_s$ give rise to signals corresponding to $C_o^{ep}$, $C_o^{th}$ and $C_f^{th}$. The comparator 38 may be a microprocessor or a programmed computer for interrogating the calibrator 36. The function of the comparator 38 may also be performed manually by reference to calibration curves.

Figure 4:
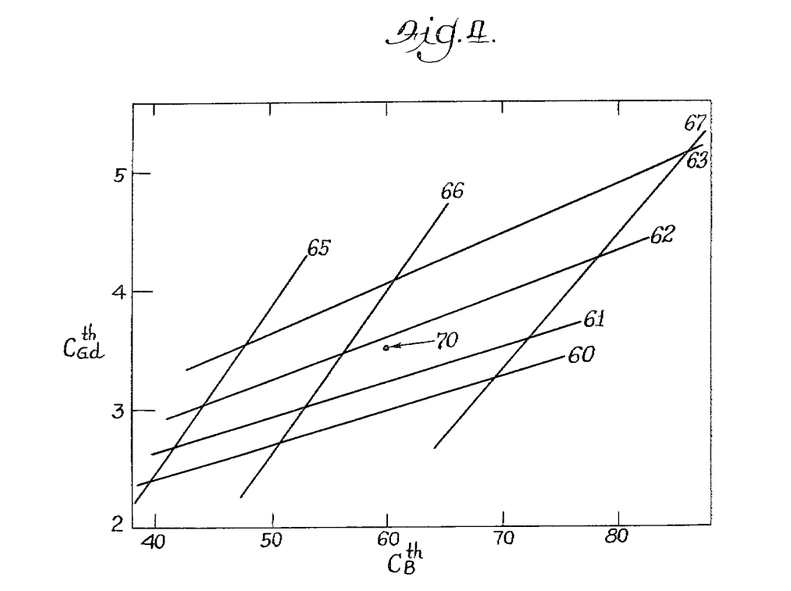
FIG. 4 is an example of a two-dimensional chart comprising part of one form of calibrator used in the present invention.
Figure 5:
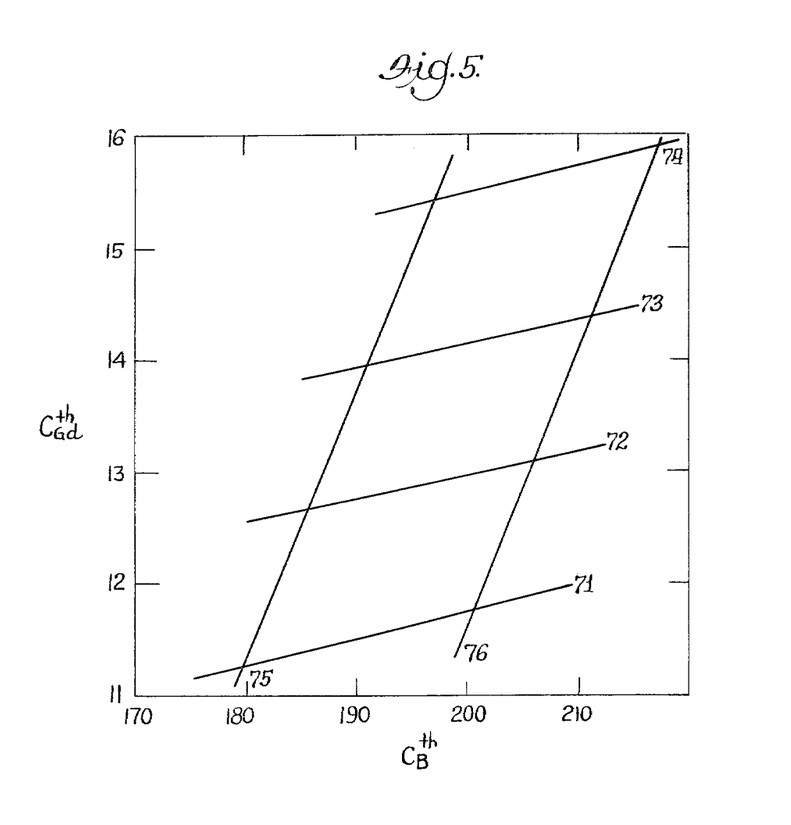
FIG. 5 is an example of a two-dimensional chart similar to that shown in FIG. 4 but comprising a different part of the calibrator.

One form of calibrator consists of a set of two dimensional plots (planes in the three dimensional space) of values of $C_f^{th}$ and $C_o^{th}$ for fixed values of $C_o^{ep}$ obtained experimentally at accurately known temperatures with a number of well-characterized calibration media such as mixtures of silica sand, water, and boric acid. FIG. 4 is an example of such a two dimensional plot of measured values of $C_{Gd}^{th}$ and $C_B^{th}$ for a medium with fixed moderating power, i.e., constant value of $C_B^{ep}$. Each one of the lines 60, 61, 62, 63 represents the locus of data points $(C_{Gd}^{th}, C_B^{th})$ at a respective fixed temperature T, but for various absorption cross sections $\Sigma_a$. Each of the lines 65, 66, 67 on the other hand, represents the locus of points $(C_{Gd}^{th}, C_B^{th})$ for a respective fixed value of $\Sigma_a$, but at various temperatues T. The point is that every point $(C_{Gd}^{th}, C_B^{th})$ on this plane determines uniquely a point $(T, \Sigma_a)$. The T and $\Sigma_a$ values corresponding to measured counts of $C_{Gd}^{th}$ and $C_B^{th}$ located between lines, such as point 70 in FIG. 4, are obtained by interpolation. FIG. 5 presents another two dimensional plot of observed values of $C_{Gd}^{th}$ and $C_B^{th}$ for a medium with moderating power different (lower) from that of the example shown in FIG. 4. The curves 71, 72, 73 and 74 correspond respectively to constant temperatures and are therefore like curves 60, 61, 62 and 63 in FIG. 4. Each of the curves 75 and 76 represents a fixed value of $\Sigma_a$ and is similar to curves 65, 66 and 67 in FIG. 4.

The plots $C_{Gd}^{th}$ and $C_B^{th}$ (of which FIGS. 4 and 5 are representative examples) for various values of $C_B^{ep}$ are similar in general but are different in detail. The transition between the various planes, however, is smooth, as $C_B^{ep}$ increases or decreases monotonically. Therefore, it is necessary to determine experimentally only a relatively small number of two dimensional plots, like that of FIG. 4, corresponding to media with several different values of $\xi\Sigma_s$ (moderating power). Plots of $C_{Gd}^{th}$ and $C_B^{th}$ for $\xi\Sigma_s$ values different from those for which calibration measurements are actually performed can be obtained by interpolation.

The set of two dimensional plots thus constitutes a three dimensional transform whereby the three derived indicia $C_o^{ep}$, $C_o^{th}$, which in the example are $C_B^{ep}$, $C_B^{th}$ and $C_{Gd}^{th}$, locate a point in the three dimensional calibrator. This point, using the calibration curves, identifies unambiguously the values of the three properties being determined, T, $\Sigma_a$ and $\xi\Sigma_s$.

The transform may be performed automatically by entering the information contained in the plots in a memory bank that can be appropriately addressed by an electronic comparator 38. In that case, the calibration data stored in the calibrator 36 consist of a number of sets of data, each set being identified by a value of $C_B^{ep}$ corresponding to a specific value of $\xi\Sigma_s$. Each set of calibration data corresponds to a fixed value of $C_B^{ep}$ (or $\xi\Sigma_s$) and, hence, to two dimensional plots of $C_{Gd}^{th}$ as a function $C_B^{th}$. Therefore, it consists of a table of values of $C_{Gd}^{th}$ and $C_B^{th}$ obtained empirically and the corresponding values of T and $\Sigma_a$ representing the conditions under which the calibration measurements are made.

The first step in the machine search of calibration data is for the comparator 38 to interrogate the calibrator 36 and locate the value of $C_B^{ep}$ determined for the medium 10 under examination. This will likely fall between two values of $C_B^{ep}$ in the calibration data. Therefore, the second step is to determine the plots of $C_{Gd}^{th}$ as a function of $C_B^{th}$ corresponding to the value of $C_B^{ep}$ for the medium by interpolation. The third step is to locate the point in this plot corresponding to the values of $C_{Gd}^{th}$ and $C_B^{th}$ observed in respect to the medium 10. The fourth and final step is to produce the output (for printing, plotting or storage by the respective output devices 40, 42 and 44) consisting of the value of the moderating power $\xi\Sigma_s$ of the medium 10 corresponding to the derived indicium $C_B^{ep}$ and its temperature T and neutron absorption cross section $\Sigma_a$ corresponding to the derived indicia of $C_{Gd}^{th}$ and $C_B^{th}$.

Figure 6:
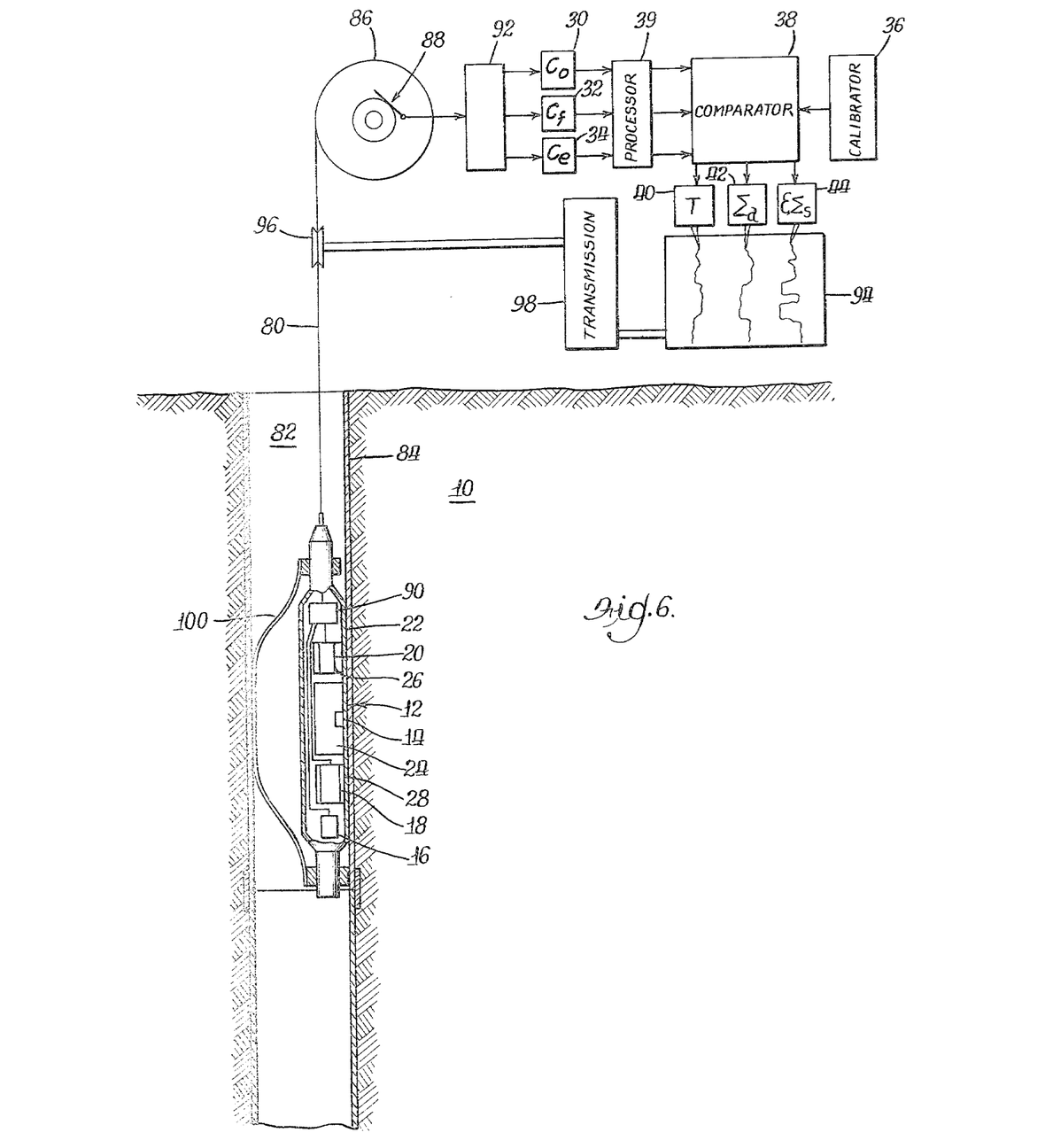
FIG. 6 is a drawing, partly in section and partly diagrammatic, showing an embodiment of the present invention for nuclear well logging.

In FIG. 6 is illustrated an alternative form of the invention adapted for nuclear well logging. In this embodiment the neutron source 14 and the neutron detectors 16, 18 and 20 are disposed in a sonde 12 of the sort conventional in well logging. The sonde is suspended on a logging cable 80 by which the sonde is lowered and raised in a borehole 82 that penetrates the medium 10, in this case, the earth formations. The borehole 82 may be protected by a well casing 84. The cable 80 is moved by a drum 86 on conventional hoist equipment. Electrical signals are transmitted over the cable 80 in any suitable and well known manner. The signals may be sent over multiple conductors or multiplexed over a single insulated conductor, the cable sheath acting as a return path. The signals are taken off the cable by way of a brush and slip ring arrangement 88 on the drum 86. Appropriate conventional signal processing circuits 90 and 92 may be used for processing the signals suitably for transmission over the long cable to the rate meters 30, 32 and 34. If desired, the rate meters may be disposed in the sonde 12 and the rate meter signals processed for transmission over the cable 80. As is conventional in well logging, the information being determined is recorded on a recorder chart 94 driven as a function of the depth of the sonde 12 by a measuring reel 96 over which the cable 80 runs. The reel 96 drives the chart 94 by way of a suitable transmission mechanism 98. If desired, a bow spring 100 may be used to urge the neutron source 14 and the detectors 16, 18 and 20 against the wall of the borehole 82. The resulting record or well log may be used in the manner of conventional slow neutron logs and additionally provides a temperature log. The logs of neutron absorption cross section $\Sigma_a$ and moderating power $\xi\Sigma_s$ may be used to indicate porosity and lithology in the effort to find oil or other valuable minerals.

Although two specific embodiments of the invention have been shown, various modifications thereof are within the scope of the present invention. For example, various known nuclear logging apparatus and techniques may be used with the present invention. Other detectors and signal processing equipment may be used. In particular, a suitably programmed microprocessor may be used to perform the common operations on the respective signals of counting, adding, subtracting and multiplying. Other ranges of neutron energies may be detected and other filtering materials may be used, particularly in applications where other temperature ranges are measured. Particular applications include geothermal well logging and the temperature determination in coal conversion plants, steel mills and fluidized bed reactors.

What is claimed is:

1. A method for determining the temperature of a medium comprising irradiating the medium with fast neutrons, separately detecting in three respective first energy ranges slow neutrons thereupon returning from the medium by producing three detection signals each systematically related to the slow neutron population detected in a respective one of such first energy ranges, combining said three detection signals to produce three derived indicia each systematically related to the population of slow neutrons returning from the medium in a respective one of three second energy ranges, at least two of said derived indicia and their respective second energy ranges differing from all of said detection signals and their respective first energy ranges, and comparing the derived indicia with calibration indicia similarly systematically related to the population of slow neutrons in said three second energy ranges returning from similarly irradiated calibration media for which the relationships of temperature to said calibration indicia are known to identify the temperature for which the calibration indicia correspond to the derived indicia.

2. A method according to claim 1 wherein one of said second energy ranges is substantially exclusively epithermal and the other two of said second energy ranges are substantially exclusively thermal.

3. A method according to claim 2 wherein one of said other two second energy ranges includes substantially all thermal energies.

4. A method according to claim 2 wherein one of said first energy ranges is substantially exclusively epithermal and the other two of said first energy ranges include thermal energies.

5. A method according to claim 4 wherein a signal substantially proportional to said detection signal related to the population of slow neutrons in said one of said first energy ranges is differentially combined with respective signals substantially proportional to the other two of said detection signals to produce said derived indicia corresponding to the population of slow neutrons in said other two of said second energy ranges.

6. A method according to claim 4 wherein one of said other two first energy ranges includes substantially all thermal energies.

7. A method according to claim 6 wherein one of said other two second energy ranges includes substantially all thermal energies.

8. A method according to claim 1 wherein the relationships of the neutron absorption cross section and the neutron moderating power of said calibration media to said calibration indicia are known and said comparing step further identifies the neutron absorption cross section and the neutron moderating power for which the calibration indicia correspond to the derived indicia.

9. A method for determining the temperature, neutron absorption cross section and moderating power of a medium comprising irradiating the medium with fast neutrons; separately detecting in three respective first energy ranges slow neutrons thereupon returning from the medium by producing three detection signals each systematically related to the slow neutron population detected in a respective one of such first energy ranges, one of said first energy ranges being substantially exclusively epithermal, the other two of said first energy ranges including thermal energies, and one of said other two first energy ranges including substantially all thermal energies; combining said three detection signals to produce three derived indicia each systematically related to the population of slow neutrons returning from the medium in a respective one of three second energy ranges, one of said second energy ranges being substantially exclusively epithermal, and the other two of said second energy ranges being substantially exclusively thermal, one of said other two second energy ranges including substantially all thermal energies, a signal substantially proportional to said detection signal corresponding to the population of slow neutrons in said one of said first energy ranges being differentially combined with respective signals substantially proportional to the other two of said detection signals to derive said derived indicia corresponding to the population of slow neutrons in said other two of said second energy ranges; and comparing the derived indicia with calibration indicia similarly systematically related to the population of slow neutrons in said three second energy ranges returning from similarly irradiated calibration media for which the relationships of temperature, neutron absorption cross section and neutron moderating power to said calibration indicia are known to identify the temperature, neutron absorption cross section and neutron moderating power for which the calibration indicia correspond to the derived indicia.

10. A method of nuclear well logging for determining the temperature, neutron absorption cross section and neutron moderating power of a medium outside a borehole comprising traversing the borehole with a source of fast neutrons to irradiate the medium with fast neutrons, at the same time separately detecting in three respective first energy ranges slow neutrons thereupon returning from the medium at successive depths in the borehole by producing three detection signals each systematically related to the slow neutron population detected in a respective one of such first energy ranges, combining said three detection signals to produce three derived indicia each systematically related to the population of slow neutrons returning from the medium in a respective one of three second energy ranges, at least two of said derived indicia and their respective second energy range differing from all of said detection signals and their respective first energy ranges, comparing the derived indicia with calibration indicia similarly systematically related to the population of slow neutrons in said three second energy ranges returning from similarly irradiated calibration media for which the relationships of temperature, neutron absorption cross section and neutron moderating power to said calibration indicia are known to provide separate indications of temperature, neutron absorption cross section and neutron moderating power for which the calibration indicia correspond to the derived indicia, and recording the separate indications as a function of the depth in the borehole at which the fast neutrons are injected.

11. Apparatus for determining the temperature of a medium comprising a neutron source for irradiating the medium with fast neutrons, first, second and third detectors of slow neutrons disposed within the range of slow neutrons returning from the medium upon such injection, each of said detectors being differently responsive to slow neutrons of different respective first energy ranges by producing a respective detection signal systematically related to the slow neutron population detected by the respective one of such first, second and third detectors, means for combining said three detection signals to produce three derived indicia each systematically related to the population of slow neutrons in a respective one of three second energy ranges, at least two of said derived indicia and their respective second energy ranges differing from all of said detection signals and their respective first energy ranges, and a calibrator providing calibration indicia similarly systematically related to the population of slow neutrons in said three second energy ranges returning from similarly irradiated calibration media for which the relationships of temperature to said calibration indicia are known, whereby comparison of the calibration indicia and the derived indicia provides an indication of the temperature of the medium.

12. Apparatus according to claim 11 wherein one of said second energy ranges is substantially exclusively epithermal and the other two of said second energy ranges are substantially exclusively thermal.

13. Apparatus according to claim 12 wherein one of said other two second energy ranges includes substantially all thermal energies.

14. Apparatus according to claim 11 wherein said first detector is sensitive substantially exclusively to epithermal neutrons and said second and third detectors are sensitive to slow neutrons including neutrons of thermal energies.

15. Apparatus according to claim 14 wherein a first shield of thermal neutron absorbing material excludes substantially all thermal neutrons from reaching said first detector.

16. Apparatus according to claim 15 wherein said first shield comprises a layer of cadmium disposed about said first detector.

17. Apparatus according to claim 14 wherein said third detector is sensitive to slow neutrons including neutrons of substantially all thermal energies.

18. Apparatus according to claim 17 wherein a first shield of thermal neutron absorbing material excludes substantially all thermal neutrons from reaching said first detector, and a second shield of material absorbing neutrons in a portion of the thermal neutron spectrum excludes a limited portion of the thermal neutrons from reaching said second detector, said third neutron detector being substantially unshielded.

19. Apparatus according to claim 18 wherein said first shield comprises a layer of cadmium disposed about said first detector, and said second shield comprises a layer of gadolinium disposed about said second detector.

20. Apparatus according to claim 14 wherein said means for combining includes differential combining means for differentially combining a signal substantially proportional to said detection signal produced by said first detector with respective signals substantially proportional to the detection signals produced by said second and third detectors to derive said derived indicia corresponding to the population of slow neutrons in two of said second energy ranges substantially exclusively thermal neutrons.

21. Apparatus according to claim 11 wherein different shields make said first, second and third detectors sensitive to slow neutrons of different first energy ranges.

22. Apparatus according to claim 11 comprising means for comparing said derived indicia with said calibration indicia to provide an indication of the temperature of the medium.

23. Apparatus according to claim 11 wherein the relationships of the neutron absorption cross section and the neutron moderating power of the calibration media to said calibration indicia are known, whereby comparison of the calibration indicia and the derived indicia provides indications of the neutron absorption cross section and the neutron moderating power of the medium.

24. Apparatus according to claim 23 comprising means for comparing said derived indicia with said calibration indicia to provide indications of the temperature, neutron absorption cross section and neutron moderating power of the medium.

25. Apparatus for determining the temperature, neutron absorption cross section and neutron moderating power of a medium comprising an instrument housing; a neutron source disposed within said housing for irradiating the medium with fast neutrons; first, second and third detectors of slow neutrons also disposed within said housing within the range of slow neutrons returning from the medium upon such injection, each of said detectors being differently responsive to slow neutrons of different respective first energy ranges by producing a respective detection signal systematically related to the slow neutron population detected by the respective one of such first, second and third detectors, said first detector being sensitive substantially exclusively to epithermal neutrons, said second detector being sensitive to slow neutrons including neutrons in a limited portion of the thermal neutron spectrum, and said third detector being sensitive to slow neutrons including neutrons over substantially the entire thermal neutron spectrum; means for combining said three detection signals to produce three derived indicia each systematically related to the populaton of slow neutrons in a respective one of three second energy ranges, one of said second energy ranges being substantially exclusively epithermal, and the other two of said second energy ranges being substantially exclusively thermal, one of said other two second energy ranges including substantially all thermal energies, said means for combining including differential combining means for differentially combining a signal substantially proportional to said detection signal produced by said first detector with respective signals substantially proportional to the detection signals produced by said second and third detectors to derive said derived indicia corresponding to the population of slow neutrons in the other two of said second energy ranges; a calibrator providing calibration indicia similarly systematically related to the population of slow neutrons in said three second energy ranges returning from similarly irradiated calibrations media for which the relationships of temperature, neutron absorption cross section and neutron moderating power of said calibration indicia are known; and means for comparing said derived indicia with said calibration indicia to provide indications of the temperature, neutron absorption cross section and neutron moderating power of the medium.

26. Nuclear well logging apparatus for determining the temperature, neutron absorption cross section and neutron moderating power of a medium outside a borehole comprising an instrument housing, a neutron source disposed within said housing for irradiating the medium with fast neutrons, first, second and third detectors of slow neutrons also disposed within said housing within the range of slow neutrons returning from the medium upon such injection, each of said detectors being responsive to slow neutrons in one of three respective first energy ranges by producing a respective detection signal systematically related to the slow neutron population detected in the respective one of such first energy ranges, means for traversing said borehole with said instrument housing, means for combining said three detection signals to produce three derived indicia each systematically related to the population of slow neutrons in a respective one of three second energy ranges, at least two of said derived indicia and their respective second energy ranges differing from all of said detection signals and their respective first energy ranges, a calibrator providing calibration indicia similarly systematically related to the population of slow neutrons in said three second energy ranges returning from similarly irradiated calibration media for which the relationships of temperature, neutron absorption cross section and neutron moderating power to said calibration indicia are known, means for comparing said derived indicia with said calibration indicia to provide separate indications of the temperature, neutron absorption cross section and neutron moderating power of the medium, and means for recording said separate indications as a function of the depth of said instrument housing in said borehole.

* * * * *